G. F. KNIGHT.
Dog for Saw Mill Carriages.
No. 233,627. Patented Oct. 26, 1880.
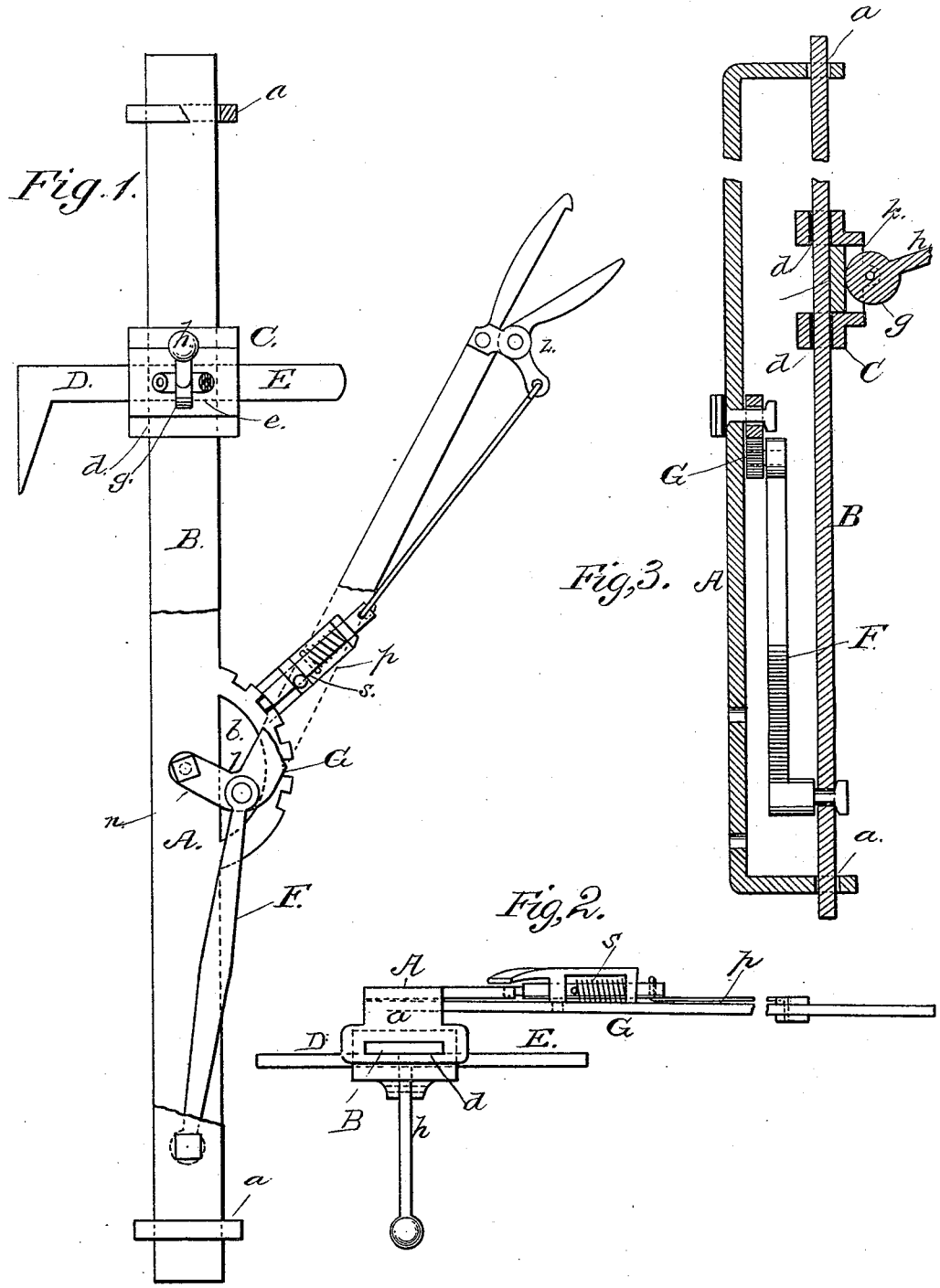

UNITED STATES PATENT OFFICE.

GEORGE F. KNIGHT, OF HICKSVILLE, OHIO.

DOG FOR SAW-MILL CARRIAGES.

SPECIFICATION forming part of Letters Patent No. 233,627, dated October 26, 1880.

Application filed February 19, 1880.

*To all whom it may concern:*

Be it known that I, GEORGE F. KNIGHT, of Hicksville, in the county of Defiance and State of Ohio, have invented a new and valuable Improvement in Dogs for Saw-Mill Carriages; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a side view of my improved saw-mill dog. Fig. 2 is a top view thereof, and Fig. 3 is a longitudinal section of the same.

This invention has relation to dogs for fastening logs on saw-mill carriages; and it consists in the combination, with an adjustable dog, a slide-bar, its operating-lever, and pitman, of a slide-head having a slotted way and an offset slideway at right angles thereto, an eccentric-lever, and a fastening, as hereinafter shown and described.

In the accompanying drawings, the letter A designates the slideway or frame, constructed in elongated form of metal, and having at its ends slot-bearings $a$, for the reception of the slide-bar, and near its middle portion a curved ratchet or notched arc, $b$. This slide-frame is also provided with bolt-holes $c$, so that it can be firmly secured to the knee of the head-block in an upright position.

B represents the slide-bar, elongated in form, with parallel sides and edges, the ends of which play in the bearing-slots $a$ of the slideway-frame A. On this bar is arranged the box or head C, which is recessed, being formed with a slotted way, $d$, for the slide-bar, and with an offset slot or way, $e$, at right angles thereto, for the dog D, which is provided with a stem, E, which passes through the way $e$. The head can therefore be readily adjusted up and down on the slide-bar, and the dog also adjusted at right angles to said bar, both adjustments being secured by an eccentric fastening or cam, $g$, having a lever-handle, $h$, this cam being pivoted to the head or box, and working through a slot, $k$, therein against the stem of the dog, forcing the same against the slide-bar.

Near the lower end of the slide-bar is pivoted thereto a pitman, F, the lower end of which is pivoted to the angle $l$ of a knee-lever, G. This lever has a short branch, $n$, at right angles, or nearly so, with its handle portion $p$, and is pivoted at the end of the short branch $n$ to the slideway-frame A, in line, or nearly in line, with the lower pivot of the pitman, as indicated in the drawings, so that when the dog is forced down into the log the lever will be also down, out of the way, and not liable to be casually operated, throwing the dog out.

The lever is provided with a spring bolt or pawl, $s$, designed to engage with the ratchet $b$, and serving to hold the slide-bar and dog up or down, according to requirement.

The spring-bolt $s$ is connected with a small angle-lever, $z$, at the handle end of the main lever, for convenience in operating.

Having described this invention, what I claim, and desire to secure by Letters Patent, is—

The combination, with the adjustable dog D, the slide-bar B, and its operating-lever and pitman, of the slide-head C, having the slotted way $d$ and the offset slideway $e$ at right angles thereto, and the eccentric-lever fastening $g$, substantially as specified.

In testimony that I claim the above I have hereunto subscribed my name in the presence of two witnesses.

GEORGE F. KNIGHT.

Witnesses:
C. C. LEHMAN,
EDWIN E. HALE.